Oct. 23, 1962　　　J. C. TURDO ETAL　　　3,059,771
CLASSIFICATION DEVICE
Filed June 19, 1959　　　　　　　　　　　　　　2 Sheets-Sheet 2
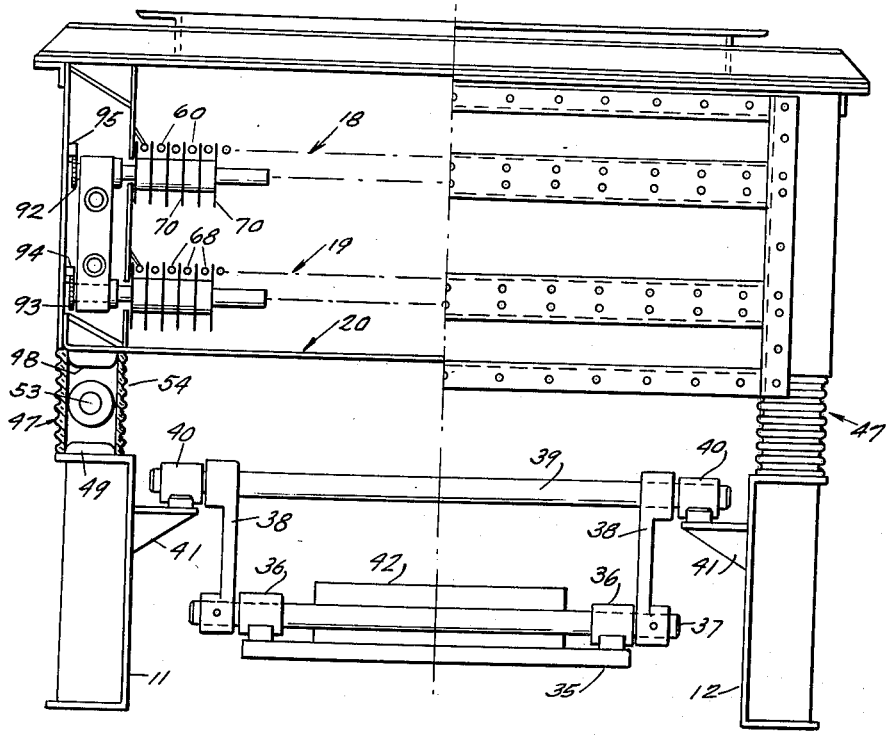
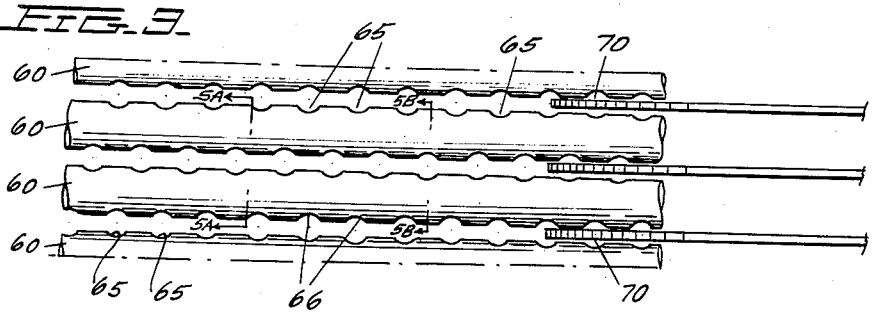
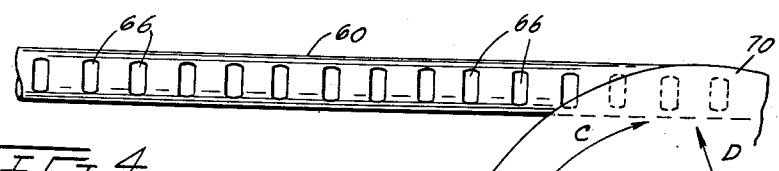
INVENTORS
JOSEPH C. TURDO
NATHAN SHAPIRO
BY
ATTORNEYS United States Patent Office 3,059,771
Patented Oct. 23, 1962

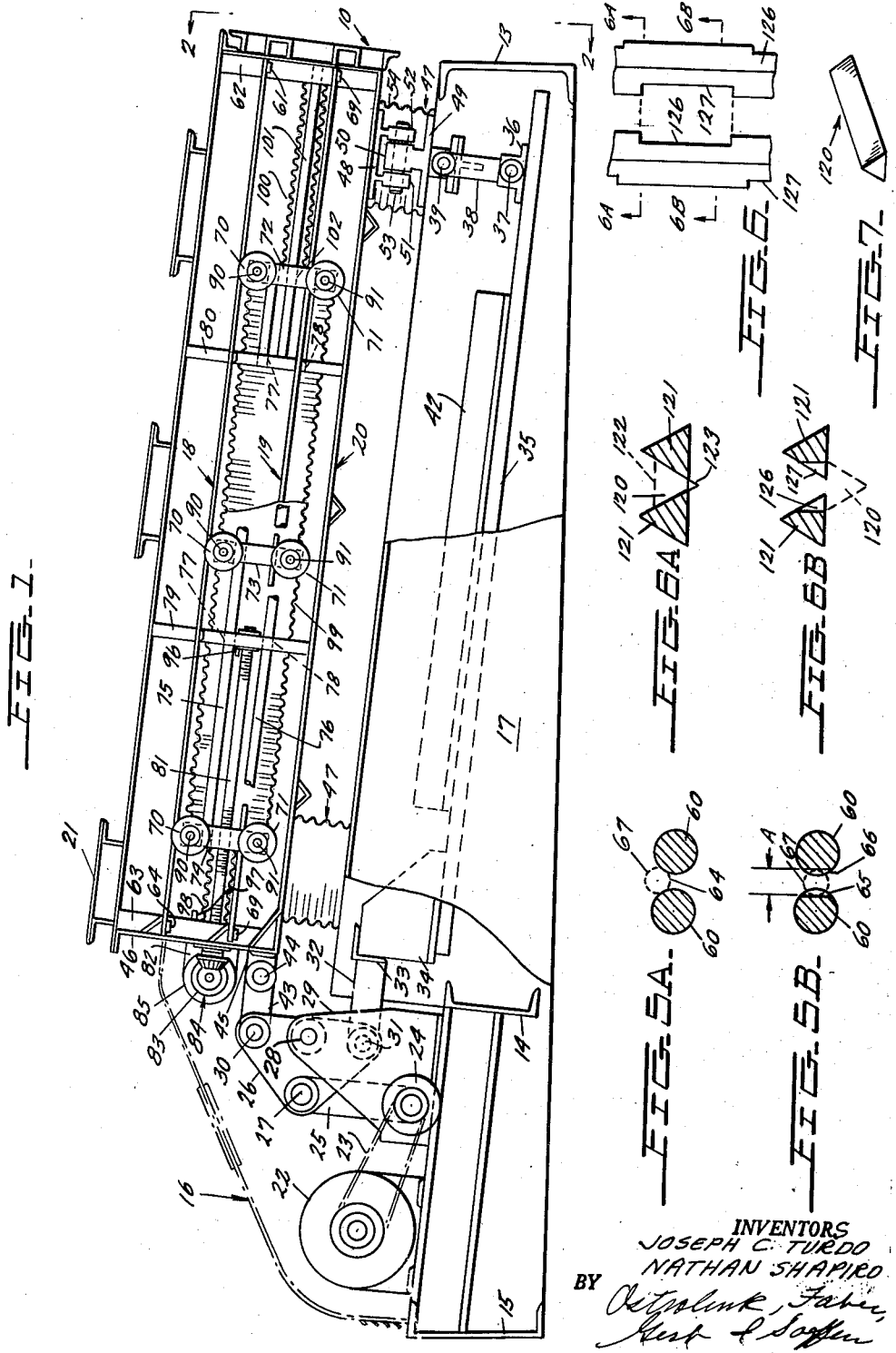

3,059,771
CLASSIFICATION DEVICE
Joseph C. Turdo, 125 Northfield Ave., West Orange, N.J., and Nathan Shapiro, 264 Lexington Ave., New York, N.Y.
Filed June 19, 1959, Ser. No. 821,392
6 Claims. (Cl. 209—99)

The instant invention generally relates to classification machinery for separating articles which fall within given tolerances of size and shape from those articles which fall outside these tolerances and more particularly to a classification machine of this type having high capacity and which is completely non-clogging due to the inclusion of a positive acting self-cleaning mechanism.

Today, size and shape classification machines are of considerable importance to industry, especially those industries utilizing automatic high speed machines which require that the product handled be of uniform size and shape for satisfactory operation. In order to insure the production of components free from defects, it is essential that the size and shape of the machine charge be kept within close tolerances. It has been found to be more economical to be careless in the formation of the articles which comprise the charge and thereafter classify the articles rather than initially exercising great care in forming the article to a predetermined size and shape.

Classification machines of the prior art usually included extremely large classification decks having a plurality of classification openings therein. It was found that a great number of the articles fed to the classification deck never became exposed to a classification opening. Hence, even if these articles fell within tolerances they were never delivered as classification product. Classification product is the term which will be applied to those articles falling within the tolerance range which are delivered by the classification machine.

Further, it has been found that an excessive amount of time is required before most of the articles are exposed to a classification opening. Because of this the classification deck must be extremely large in area.

In order to overcome these undesirable conditions the classification deck of the instant invention includes tracking means whereby the articles to be classified are directed toward the classification openings. This is accomplished by constructing the classification deck of a plurality of inclined longitudinally extending parallel rods which are spaced from one another and are so shaped as to form wide mouthed tracks therebetween. The classification openings are formed by notched formations in the sides of the rods. Thus, articles introduced to the classification deck readily find their way into the tracks which direct the articles to the classification openings due to the inclination of the classification deck and vibration thereof.

The classification deck of the instant invention is supplied with a vibratory motion whose line of action is parallel to the longitudinal axes of the rods forming the deck. The advantage of vibration parallel to the rod axis, or longitudinal direction, only lies in the fact that up-ending of the articles is prevented thereby decreasing the possibility of large or odd shaped articles from passing through as classification product falling within tolerances when articles of irregular shape are being classified. The term irregular shape refers to those articles which are not of equal dimension in cross-sections taken through all three principal planes thereof.

The device of the instant invention is made non-clogging by a continuously or intermittently operated positive cleaning mechanism. This mechanism comprises a series of combs whose fingers are constructed as knives, wires, etc. and are operated longitudinally and/or vertically extending upwardly into the tracks formed by the openings between the rods of the classification table. The combs remove articles which have become wedged between the rods at or between the classification openings to thereby effectively increase the utilization time of each classification hole. This completely eliminates cleaning down time and also eliminates the discharge of articles within tolerances as rejected material thereby resulting in greater efficiency at higher capacity per unit of deck area.

The comb fingers may comprise non-rotating members, rotating disks, or rotating members of various toothed designs, the size and shape of the articles being classified. These combs primarily clear the deck holes and as an additional benefit provide gentle agitation to the articles being classified which increases the classification activity of each classification hole by better tracking of the articles.

Accordingly, a primary object of the instant invention is to provide a novel classification machine which is more efficient than similar machines of the prior art in that the machine of the instant invention is of higher capacity per unit of classification deck area than the prior art machines.

Another object is to provide a novel classification machine including novel tracking means for directing the charge members to the classification openings.

Still another object is to provide a classification machine werein the classification openings are comprised of formations in the form of depressions in the parallel rods which form the classification deck.

A further object is to provide a classification machine which includes novel cleaning means for preventing clogging of the classification openings.

A still further object is to provide a novel classification machine including a positive cleaning mechanism which is movable into and out of the classification openings and is also movable along the tracks which direct articles to the classification openings so as to prevent clogging thereof.

These as well as other objects of the instant invention shall become readily apparent after reading the following description of the accompanying drawings in which:

FIGURE 1 is a sectionalized elevation of a classification machine constructed in accordance with the instant invention.

FIGURE 2 is an end view of the classificaton machine of FIGURE 1 looking in the direction of the arrows 2—2 of FIGURE 1.

FIGURE 3 is a fragmentary plan view of the upper classification deck.

FIGURE 4 is an enlarged fragmentary view, in elevation, which shows the relationship between one of the comb teeth and a rod having formations which comprise the classification openings.

FIGURES 5A and 5B are cross-sections of the upper-classification deck taken through lines 5A—5A and 5B—5B, respectively, of FIGURE 3 looking in the directions of the respective arrows.

FIGURE 6 is a fragmentary plan view of a modified upper classification deck.

FIGURES 6A and 6B are cross-sections taken through lines 6A—6A and 6B—6B, respectively, of FIGURE 6 looking in the directions of the respective arrows.

FIGURE 7 is a perspective of an article which is to be classified by the upper-classification deck of FIGURE 6.

Now referring to the figures, classification machine 10 is mounted upon a stationary base 17 which is comprised of longitudinal structural members 11, 12 tied together by transverse structural members 13–15. Eccentric drive mechanism 16 mounted to the rear end of the base 17 is connected to classification machine 10 so as to impart longitudinal vibratory motion thereto as will be hereinafter explained.

Briefly, classification machine 10 comprises an upper classification deck 18 and a lower classification deck 19 as well as a flat deck 20 below lower classification deck 19. All three decks 18–20 are parallel to each other and are inclined downwardly with respect to the horizontal axis from the rear ends thereof to the front ends thereof with the front end being designated as the discharge end of the classification machine 10.

As will be hereinafter explained in detail the articles to be classified are introduced to classification machine 10 through inlet 21 so that they are received by the upper classification deck 18 at the rear end thereof. Those articles to be classified which are larger than dictated by a first set of tolerances will work their way from the rear end of upper classification deck 18 to the front end thereof where they will be discharged as oversized articles. All other articles to be classified will pass through openings in upper classification deck 18 and fall to lower classification deck 19 where these articles which are smaller than dictated by a second set of tolerances will pass through openings in lower classification deck 19 and fall to the lowest deck 20.

The articles which reach lower classification deck 19 and are of such a size that they fall between the first and second set of tolerances will work their way along the lower classification deck 19 to the forward end thereof where they will be discharged as the classification product. Articles to be classified which reach the lowest deck 20 will be discharged at the forward end as undersized articles.

Vibratory motion is imparted to classification machine 10 by means of drive motor 22 which is mounted to base 17 at the rear end thereof. Motor 22 acting through belt 23 drives eccentric means 24 which may be comprised of a simple crank mechanism including link 25 pivotally mounted to rocker plate 26 at pivot 27. Rocker plate 26 is mounted upon stationary pivot 28 secured to bracket 29 extending upwardly from base 17. Upper and lower pivot points 30, 31 mounted to rocker plate 26 are positioned above and below stationary pivot 28 with the three pivots 28, 30 and 31 being positioned in a straight line.

Connecting rod 32 extends from lower pivot 31 to bracket 33 which is secured to another bracket 34 having one end of longitudinal member 35 mounted thereto. The other end of longitudinal member 35 is provided with bearing brackets 36 mounted upon pivot shafts 37. One end of each support link 38 is mounted to shaft 37 while the other end of each support link 38 is mounted to a stationary pivot shaft 39. The ends of shaft 39 are mounted to bearings 40 which are secured to brackets 41 extending inwardly from longitudinal base members 11, 12. Thus, as rocker plate 26 is rocked upon its pivot 28, counterbalance weight 42, carried by a longitudinal member 35, will be caused to move back and forth in the direction of the longitudinal axis of classification machine 10.

Upper pivot 30 on rocker plate 26 is connected to one end of link 43 whose other end is connected to pivot 44 at the rear end of member 45 which extends rearwardly from vertical frame member 46 of classification machine 10. Bearing assemblies 47 are interposed between classification machine 10 and base 17 at the rear and forward ends of classification machine 10 at both sides thereof. Since all four of the bearing assemblies 47 are of an identical construction, for the sake of brevity, only one will be described.

Each bearing assembly 47 comprises a yoke-like support 48 secured to the bottom of the lowest deck 20. Bearing member 49 extends upwardly from base 17 and includes a portion 50 which is positioned between downwardly extending arms 51, 52 of yoke 48. Bearing shaft 53 extends between yoke arms 51, 52 through an opening in bearing portion 50. Shaft 53 is maintained against axial movement with respect to bearing portion 50 by suitable set screw means (not shown). It is to be noted that arms 51, 52 are spaced apart by a distance greater than the width of bearing portion 50 so that shaft 53 may move axially with respect to yoke support 48. A bellows type boot 54 encloses the members of bearing assemblies 47 hereinbefore recited.

Thus, as rocker plate 26 is rocked about stationary pivot 28 the shafts 53 of bearing assemblies 47 will confine the vibratory motion imparted to classification machine 10 to a direction parallel to the longitudinal axes of shafts 53. It is to be noted that movement of classification machine 10 to the right with respect to FIGURE 1 will result in a movement of the counterbalance 42 to the left with respect to FIGURE 1 and movement of counterbalance 42 to the right will be accompanied by movement of classification machine 10 to the left. The weight of counterbalance 42 is chosen to counterbalance the weight of classification machine 10 so as to effectively reduce the vibratory force acting upon base 17.

Upper classification deck 18 is comprised of a plurality of longitudinally extending rods 60 extending between transverse frame members 61 which are supported by vertical frame members 62, 63 at opposite ends of classification machine 10. In the embodiment illustrated in FIGURES 1–5B rods 60 are of circular cross-section and are arranged in spaced parallel relationship so as to form tracks 64 therebetween. The sides of rods 60 include notched formations 65, 66. The notches 65 of one rod are aligned opposite the notches 66 of the adjacent rod and cooperate to form a classification opening. That is, the spherically shaped articles 67 which are to be classified will pass between rods 60 either at the classification openings or therebetween if the articles 67 do not exceed in size a first set of predetermined tolerances. Thus, the diameter of spheres 67 must not exceed the distance A (FIGURE 5B) or else the spheres 67 will remain on upper classification deck 18.

Lower classification deck 19 is comprised of a plurality of longitudinally extending rods 68 extending between transverse frame 69 which are supported by vertical frame members 62, 63. Rods 68 are arranged in spaced parallel relationship and are arranged with the longitudinal axes thereof parallel to the longitudinal axes of guide shafts 53. Rods 68 are not notched as are rods 60 of the upper classification deck 18. Rods 68 are spaced apart by a distance which permits articles which are smaller than the size established by a second set of predetermined tolerances to pass between rods 68 and fall to the lowest deck 20. Thus, the spheres 67 which do not fall to lowest classification deck 20 are those spheres 67 which fall between the first and second sets of predetermined tolerances and are delivered to the discharge end of classification 10 as the classification product.

In order to prevent the clogging of the classification openings formed by notches 65, 66 as well as to prevent the clogging of the tracks formed between adjacent rods 60 and between adjacent rods 68, classification machine 10 is provided with a comb-like means including disks 70, 71 which extend from below upper and lower classification decks 18, 19, respectively, into the tracks of the respective classification decks 18, 19. A plurality of disks 70, 71 are mounted at the upper and lower ends respectively of each pair of the vertical members 72, 73 and 74 by being keyed to shafts 90, 91 respectively.

Members 72–74 are tied together by guide rods 75, 76 which extend through openings 77, 78 of vertical frame members 79 and 80.

One member 74 is threadably mounted upon lead screw 81, one end of which is rotatably journaled in vertical frame member 79 and the other end of which is journaled for rotation by an opening in vertical frame member 46. A bevelled gear 82 is mounted to the end of lead screw 81 adjacent to vertical frame member 46 and is in mesh with the output gear 83 of gear reduction unit 84 driven by motor 85 which is secured to the frame of classification machine 10 at the rear end thereof.

Pinions 92, 93 are keyed to the shafts which form pivots 90, 91, respectively, and are operatively engaged with longitudinally extending racks 94, 95, respectively, so that movement of members 72–74 in a longitudinal direction, as will be hereinafter explained, will bring about the rotation of shafts 90, 91 and the cleaning means disks 70, 71 which are keyed to these shafts, respectively. Motor 85 is reversible with the direction thereof being determined by the position of the last of the limit switches 96, 97 to be actuated by member 74 in a manner well known to the art, as this member travels between vertical frame members 46 and 79 upon rotation of lead screw 81. Since members 72 and 73 are connected to members 74 by guide rods 75, 76 all three pairs of members 72–74 will move in unison.

Collapsible boot 98 covers lead screw 81 and is connected between vertical frame member 46 and member 74. Boot 99 extends between members 72 and 74 so as to cover guides 75, 76 while collapsible boot 100 is arranged to cover guide rod 101 extending rearwardly from vertical frame member 62 to vertical frame member 80. Guide rod 101 passes through clearance opening 102 in member 72. Boot 100 extends between vertical frame member 62 and member 72. The boots 100, 99, 98 are provided to prevent contamination to the articles being classified by preventing the engagement between these articles and the rotating lead screw 81 or moving members 72–74.

When the articles to be classified are introduced to the classification machine 10 through inlet 21 they immediately fall upon the upper classification table 18 at the raised end thereof. The vibratory motion imparted to classification machine 10, having its line of action limited to directions parallel to the longitudinal axis of rods 60, causes the articles to be classified to work their way into tracks 64. Since the tracks 64 are widest at the tops thereof they can be said to be wide mouthed. Once the articles reach a track 64 the articles are directed directly to a classification opening formed by the cooperation of notches 65, 66.

The oversized articles continue down tracks 64 to the low end of upper classification deck 18 where they are discharged as oversized articles. The remaining articles fall to the lower classification deck 19 where a similar action takes place with the articles remaining upon lower classification deck 19 falling within the given tolerances so as to be discharged at the low end of lowest classification deck 19 as the classification product. Thus, articles which are small enough to pass between the spaces of rods 68 forming the lower classification deck 19 reach the lowest deck 20 and work their way to the low end thereof being discharged as undersized articles.

The cleaning disks 70, 71 are continuously moving back and forth in the direction of the longitudinal axes of rods 60 so as to gently agitate and force wedged articles from track 64 and the classification openings formed by notches 65, 66 so that none of the tracks 64 will become clogged and in this manner the classification machine 10 achieves a high output rate with a small area. With the cleaning means moving in the direction of arrow B (FIGURE 4), disks 70 will rotate in a clockwise direction, indicated by arrow C, and a resultant ejection component of force, indicated by arrow D, will act upon the articles in tracks 64.

While the classification decks 18, 19 of classification machine 10, hereinbefore described, are constructed of circular rods and the notches are portions of circular circumferences, different applications require rods and classification openings of different shapes. For example, in order to classify the article 120 of FIGURE 7, which is an elongated member of triangular cross-section, the upper classification deck is constructed of rods 121 of triangular cross-section arranged with the bases thereof in the same plane with the apices opposite the parallel bases being positioned above these bases. With this arrangement, the articles 120 to be classified find their way to the tracks formed between rods 121 and become oriented with the article base 122 above the apex 123 formed by the other sides of article 120. Since the vibration of the classification machine is limited to directions parallel to the longitudinal axis of rods 121, there is no danger that articles 120 will become up ended. That is, once articles 120 become positioned, as illustrated in FIGURE 6A, in the tracks between rods 121, articles 120 will not become oriented with the ends thereof in a horizontal position. Thus, oversized articles 120 do not find their way through the classification openings 125 formed by rectangular notches 126, 127 in rods 129.

It is to be understood that a given application may require that the classification machine be comprised of more than two classification decks any one or more of which are constructed of notched rods and any one or more of which are provided with a cleaning means movable parallel to the axes of the rods forming the classification decks. It is also to be noted that while the members 70, 71 have been described as being circular in shape, the peripheral surface thereof may be provided with a knurl or projections for differential applications. Further, some applications may not require disks which are rotated.

While in the embodiment of our invention hereinbefore described the comb-like means is longitudinally driven by a lead screw follower nut combination, it is to be understood that this motion can also be achieved by a rack and pinion arrangement. That is, members 73 and 74 can be extended downward with a member having a rack being secured to the bottom ends of members 73 and 74. A driven pinion rotating on a horizontal axis transverse to the longitudinal axis of the classification machine engages the rack thereby imparting longitudinal motion to the comb-like means.

Although we have here described preferred embodiment of our novel invention, many variations and modifications will now be apparent to those skilled in the art, and we therefore prefer to be limited, not by the specific disclosure herein, but only by the appended claims.

We claim:

1. A classification machine including a classification deck and means for applying vibratory motion to the classification deck; said classification deck being comprised of a plurality of spaced elongated rods; a first of said rods being constructed to cooperate with a second of said rods to form a track therebetween; said first and said second rods having cooperating formations forming a plurality of classification openings along said track; said track being constructed to direct articles to be classified directly to the classification openings along said track; cleaning means including members extending from below said classification deck into said track; means for moving said cleaning means back and forth between a first and a second position; said first and said second positions being spaced apart by a distance exceeding the distance between adjacent classification openings; said last recited means being comprised of a lead screw, a follower carrying said cleaning means and threadably mounted to said lead screw, means for rotating said lead screw, and means for reversing the direction of rotation of said lead screw as said cleaning means reaches said first and said second positions.

2. A classification machine including a classification deck and means for applying vibratory motion to the classification deck; said classification deck being comprised of a plurality of spaced elongated rods; a first of said rods being constructed to cooperate with a second of said rods to form a track therebetween; said first and said second rods having cooperating formations forming a plurality of classification openings along said track; said track being constructed to direct articles to be classified directly to the classification openings along said track; cleaning means including member extending from below said classification deck into said track; means for moving said cleaning means back and forth between a first and a second position; said first and said second positions being spaced apart by a distance exceeding the distance between adjacent classification openings; means, actuated through the back and forth movement of said cleaning means, for rotating said cleaning means members.

3. A classification machine including a classification deck and means for applying vibratory motion to the classification deck; said classification deck being comprised of a plurality of spaced elongated rods; a first of said rods being constructed to cooperate with a second of said rods to form a track therebetween; said first and said second rods having cooperating formations forming a plurality of classification openings along said track; said track being constructed to direct articles to be classified directly to the classification openings along said track; cleaning means including members extending from below said classification deck into said track; means for moving said cleaning means back and forth between a first and a second position; said first and said second positions being spaced apart by a distance exceeding the distance between adjacent classification openings; said last recited means being comprised of a lead screw, a follower carrying said cleaning means and threadably mounted to said lead screw, means for rotating said lead screw, and means for reversing the direction of rotation of said lead screw as said cleaning means reaches said first and said second positions; said cleaning means members being mounted to a rotatable shaft; a pinion keyed to said shaft; a rack extending parallel to said rods and having said pinion in mesh therewith whereby movement of said cleaning means between said first and said second positions causes rotation of said cleaning means members.

4. A classification machine including a classification deck and means for applying vibratory motion to the classification deck; said classification deck being comprised of a plurality of spaced elongated rods; a first of said rods being constructed to cooperate with a second of said rods to form a track therebetween; said first and said second rods having cooperating formations forming a plurality of classification openings along said track; said track being constructed to direct articles to be classified directly to the classification openings along said track; cleaning means including members extending from below said classification deck into said track; means for moving said cleaning means back and forth between a first and a second position; said first and said second positions being spaced apart by a distance exceeding the distance between adjacent classification openings; said classification deck being inclined; a first inclined deck positioned below the classification deck and comprised of a plurality of spaced apart elongated rods forming tracks therebetween; means for applying vibratory motion to said first deck; said classification openings being sized to permit the passage therethrough from said classification deck to said first deck of articles smaller than defined by a first set of tolerances so that articles larger than said first set of tolerances do not fall to said first deck; said rods of said first deck being spaced apart by a distance sufficient to permit the passage therebetween of articles smaller than defined by a second set of tolerances so that only articles falling within the limits between said first and said second sets of tolerances are discharged from the lower end of said first deck as classification product; said cleaning means also including members extending into the tracks formed between the rods of the first deck; said last recited members being movable back and forth along said tracks of said first deck; and means, actuated by the back and forth movement of said cleaning means for imparting additional motion to said last recited members.

5. A classification machine including a classification deck and means for applying vibratory motion to the classification deck; said classification deck being comprised of a plurality of spaced elongated rods; a first of said rods being constructed to cooperate with a second of said rods to form a track therebetween; said first and said second rods having cooperating formations forming a plurality of classification openings along said track; said track being constructed to direct articles to be classified directly to the classification openings along said track; cleaning means including members extending from below said classification deck into said track; means for moving said cleaning means back and forth between a first and a second position; said first and said second positions being spaced apart by a distance exceeding the distance between adjacent classification openings; said classification deck being inclined; a first inclined deck positioned below the classification deck and comprised of a plurality of spaced apart elongated rods forming tracks therebetween; means for applying vibratory motion to said first deck; said classification openings being sized to permit the passage therethrough from said classification deck to said first deck of articles smaller than defined by a first set of tolerances so that articles larger than said first set of tolerances do not fall to said first deck; said rods of said first deck being spaced apart by a distance sufficient to permit the passage therebetween of articles smaller than defined by a second set of tolerances so that only articles falling within the limits between said first and said second sets of tolerances are discharged from the lower end of said first deck as classification product; said cleaning means also including members extending into the tracks formed between the rods of the first deck; said last recited members being movable back and forth along said tracks of said first deck; and means, actuated by the back and forth movement of said cleaning means for imparting additional motion to said last recited members; said vibratory motions of each of said decks having their respective line of action confined to a direction parallel to the longitudinal axes of the rods forming their respective decks.

6. A classification machine including a classification deck and means for applying vibratory motion to the classification deck; said classification deck being comprised of a plurality of spaced elongated rods; a first of said rods being constructed to cooperate with a second of said rods to form a track therebetween; said first and said second rods having cooperating formations forming a plurality of classification openings along said track; said track being constructed to direct articles to be classified directly to the classification openings along said track; cleaning means including members extending from below said classification deck into said track; means for moving said cleaning means back and forth between a first and a second position; said first and said second positions being spaced apart by a distance exceeding the distance between adjacent classification openings; said classification deck being inclined; a first inclined deck positioned below the classification deck and comprised of a plurality of spaced apart elongated rods forming tracks therebetween; means for applying vibratory motion to said first deck; said classification openings being sized to permit the passage therethrough from said classification deck to said first deck of articles smaller than defined by a first set of tolerances so that articles larger than said first set of tolerances do not fall to said first deck; said rods of said first deck being spaced apart by a distance sufficient to permit the passage therebetween of articles smaller than defined by a second set of tolerances so that only articles falling within the limits between said first and said second sets of tolerances are discharged from the lower end of said first deck as classification product; said cleaning means also including members extending into the tracks formed between the rods of the first deck; said last recited members being movable back and forth along said tracks of said first deck; said vibratory motions of each of said decks having their respective line of action confined to a direction parallel to the longitudinal axes of the rods forming their respective decks; means actuated through movement of said cleaning means for rotating the cleaning means members which clean both the classification and the first decks.

References Cited in the file of this patent

UNITED STATES PATENTS

| | | |
|---|---|---|
| 271,847 | Holman | Feb. 6, 1883 |
| 814,762 | Yeager | Mar. 13, 1906 |
| 1,342,571 | Porter | June 8, 1920 |
| 1,532,968 | Van Stijn | Apr. 7, 1925 |
| 1,647,815 | Riddell | Nov. 1, 1927 |
| 2,549,316 | Kremer | Apr. 17, 1951 |